United States Patent Office 3,471,472
Patented Oct. 7, 1969

3,471,472
N⁶-SUBSTITUTED ADENOSINE DERIVATIVES
Max Thiel and Werner Winter, Mannheim, and Kurt Stach, Wolfgang Schaumann, and Karl Dietmann, Mannheim-Waldhof, Germany, assignors to C. F. Boehringer & Soehne GmbH, Mannheim-Waldhof, Germany
No Drawing. Filed Aug. 8, 1967, Ser. No. 659,035
Claims priority, application Germany, Oct. 20, 1966, B 89,473
Int. Cl. A61k 27/00; C07d 57/38
U.S. Cl. 260—211.5                                      8 Claims

ABSTRACT OF THE DISCLOSURE

A series of novel N⁶-substiuted adenosine derivatives are disclosed which are possessed of hemodynamic and coronary dynamic activity and which are effective in promoting sodium diuresis.

The N'-substituted derivatives are characterized by the formula:

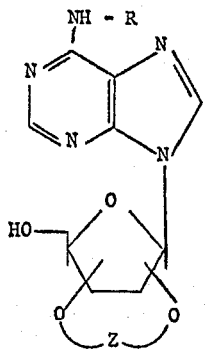

(I)

wherein R represents alkyl, alkenyl, alkynyl, cycloalkyl, aryl or aralkyl, and Z is unsubstituted or substituted cycloalkylidene or benzylidene, wherein said substituent is halogen, alkoxy, alkylthio, methylenedioxy, alkyl or trifluoromethyl.

---

This invention relates to N⁶-substituted adenosine derivatives, to compositions containing such adenosine derivatives as active ingredient and to methods of preparing and using such derivatives and compositions.

More particularly, the invention relates to N⁶-substituted adenosine derivatives having the formula:

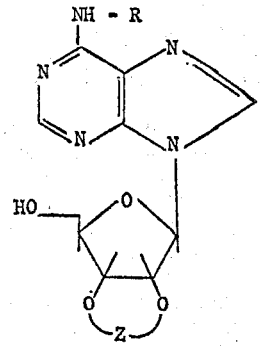

(I)

wherein R is alkyl, alkenyl, alkynyl, cycloalkyl, aryl, or aralkyl and Z is cycloalkylidene or benzylidene which may be substituted by halogen, alkoxy, alkylthio, methylene-dioxy, alkyl or trifluoromethyl.

The N⁶-substituted adenosine derivatives according to the present invention are possessed of hemodynamic and coronary dynamic activity and are effective in promoting sodium diuresis.

More specifically, the N⁶-substituted adenosine derivatives stimulate the coronary and peripheral vasculatures and in addition have direct cardiac effects which augment heart rate and increase cardiac output. The N⁶-substituted adenosine derivatives aside from increasing cardiac output increase effective renal plasma flow, glomerular filtration rate, urine flow and sodium excretion.

The N⁶-substituted adenosine derivatives according to the present invention can be prepared by the conventional methods, for example:

(1) An adenosine derivative of the formula:

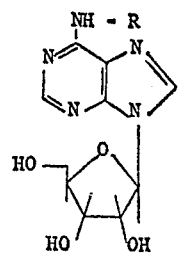

(II)

wherein R is as above defined, is reacted with an oxo compound of the formula:

$$Z=O \qquad (III)$$

in which Z is as above defined, or with aketal or acetal thereof; or (2) A compound of the formula:

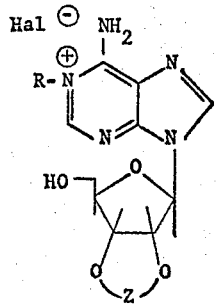

(IV)

wherein R and Z are as above defined and Hal is a halogen atom heated in alkaline solution; or (3) A purine-riboside derivative having the formula:

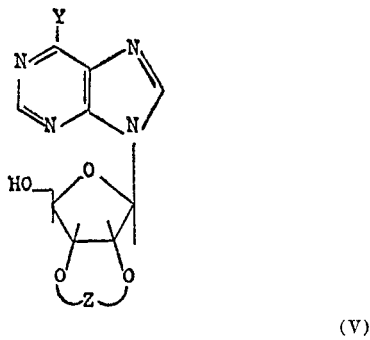

(V)

wherein Z has the same significance as above and Y is halogen, methyl-mercapto or benzyl-mercapto, is reacted with an amine of the formula:

R—NH$_2$ (VI)

wherein R has the same significance as given above.

If desired, when the compound (I) as obtained contains an alkenyl or alkynyl radical as the substituent R, then the compound can be hydrogenated in the conventional manner to produce the corresponding compound in which R is alkyl.

For carrying out the reaction of the adenosine derivative (II) with the oxo compound (III), the two components are preferably heated to 50–70° C. in the presence of an acidic catalyst, such as zinc chloride. In place of the free oxo derivatives, there can also be used the corresponding acetals or ketals, in which case hydrochloric acid, toluene-sulfonic acid or trifluoroacetic acid is preferably used as the acidic catalyst. Instances of preferred acetals and ketals include the dimethyl and diethyl derivatives. In a particularly simple variation of this process, the adenosine derivative (II) is reacted with the oxo compound (III) in an acidic medium in the presence of orthoformic acid methyl or ethyl ester, the acetal or ketal thereby formed as intermediate is then reacted further, according to the present invention, to give the desired compound (I). Some of the compounds (II) used as starting materials are known and those which are not are prepared in a manner analogous to that used for the preparation of the known compounds.

In the case of the rearrangement of the compounds (IV) to provide the compounds (I), it is sufficient to carry out a treatment with dilute alkalis, preferably at an elevated temperature. The compounds (IV) used as starting materials can be prepared by the reaction of the corresponding adenosine ketal or acetal of formula IV in which, however, R is a hydrogen atom, with the conventional N-alkylation agents. In a preferred variation of this process which avoids the necessity for the isolation of the compounds (IV), the solution is rendered weakly alkaline and then heated for a short time. In this manner, the compounds (I) are obtained directly.

For the reaction of the purine-riboside derivatives (V) with the amines (VI), the two reaction components are preferably heated together in a solvent and the reaction mixture then further worked up in the conventional manner. The compounds (V) which are used as starting materials can be obtained by the reaction of a purine-riboside derivative of the Formula V in which, however, Z represents two hydrogen atoms, with an oxo compound of the Formula III or with the acetal or ketal thereof. In principle, the same process variations are possible as have been set out in connection with the reaction of the compounds of Formula II with the compounds of Formula III.

In the case where R represents alkenyl or alkynyl the products obtained can, if desired, be converted into the corresponding compounds (I) in which R is alkyl by catalytic hydrogenation in the conventional manner.

The examples given hereinafter serve to illustrate the invention without being in any way or form considered as limitative of the scope of the same.

EXAMPLE 1

N$^6$-methyl-2',3'-O-cyclohexylidene-adenosine

A mixture of 10 g. N$^6$-methyl-adenosine (J.A.C.S., 85, 193/1963), 35 ml. dimethyl formamide, 21 ml. orthoformic acid ethyl ester and 10 ml. cyclohexanone was mixed, while stirring, with 17 ml. 5 N hydrochloric acid in dioxan. The reaction mixture was then shaken for 4 days, poured into 100 ml. 2 N sodium carbonate solution and 500 ml. water and extracted with chloroform. The chloroform extract was evaporated and the residue taken up in ligroin, filtered with suction and washed with ligroin. There were thusly obtained 9.4 g. (73% of theory) N$^6$ - methyl - 2',3'-O-cyclohexylidene-adenosine, which had a melting point of 162–164° C.

EXAMPLE 2

N$^6$-propyl-2',3'-O-cyclohexylidene-adenosine

Following a procedure analogous to that described in Example 1, from 3.1 g. N$^6$-propyl-adenosine and 3.1 ml. cyclohexanone, there were obtained 1.9 g. (49% of theory) N$^6$ - propyl - 2',3'-O-cyclohexylidene-adenosine, which had a melting point of 115–117° C.

The N$^6$-propyl-adenosine used as starting material was prepared from 6-chloropurine-9-β-D-riboside and n-propylamine by a procedure analogous to that described by H Lettré and H. Ballweg (Liebigs Ann. 656, 158/1962) and it had a melting point of 145–147° C.

EXAMPLE 3

N$^6$-allyl-2',3'-O-cyclohexylidene-adenosine

A mixture of 3.5 g. N$^6$-allyl-adenosine, 11 ml. dimethyl formamide and 5.1 g. 1,1-dimethoxy-cyclohexane was mixed with 6 ml. 5 N hydrochloric acid in dioxan. The clear solution which formed was left to stand for two days and then poured into a mixture of 25 ml. 2 N sodium carbonate solution and 125 ml. water. Following extraction with chloroform, the chloroform solution was evaporated and the residue dissolved in acetone. On the addition of ligroin, crystallization was initiated. There were obtained 2.2 g. (50% of theory) N$^6$-allyl-2',3'-O-cyclohexylidene-adenosine, which had a melting point of 121–123° C.

The N$^6$-allyl-adenosine used as starting material was prepared using a procedure analogous to that described by Jones and Robins (J.A.C.S., 85, 193/1963) and had a melting point of 165–167° C.

EXAMPLE 4

N$^6$-methyl-2',3'-O-benzylidene-adenosine

Variant A.—1 - methyl-exo-2',3'-O-benzylidene-adenosine-iodide (prepared from 10 g. exo-2',3'-O-benzylidene-adenosine), was boiled for 15 minutes with 52 ml. 0.5 N sodium hydroxide solution. The reaction mixture was then extracted with chloroform, the chloroform extract evaporated and the residue triturated with ether and filtered with suction. There were thusly obtained 8.1 g. N$^6$-methyl-exo-2',3'-O-benzylidene-adenosine, which had a meling point of 164–168° C.

The 1-methyl-exo-2',3'-O-benzylidene-adenosine-iodide used as starting material was prepared in the following manner: 10 g. exo-2',3'-O-benzylidene-adenosine were slurried in 100 ml. N-dimethyl-acetamide and then stirred for 18 hours with 10 ml. methyl iodide. The reaction mixture was thereafter diluted with 700 ml. ether and the 1 - methyl - exo - 2',3' - O - benzylidene - adenosine-iodide which formed filtered off with suction and could be used without further purification.

Variant B.—5 g. N⁶-methyl-adenosine, 20 ml. dimethyl formamide and 14.5 g. benzaldehyde-dimethyl acetal were mixed at 5° C., while stirring, with 10 ml. 5 N hydrochloric acid in dioxan. A gelatinous mass was formed which was allowed to stand for a week. The reaction mixture was then poured into a solution of 6.5 g. ammonium carbonate in 300 ml. water and extracted with chloroform. The chloroform extract was thereafter evaporated and the residue triturated with ether. There was obtained 1 g. (15% of theory) N⁶-methyl-exo-2',3'-O-benzylidene-adenosine, which had a melting point of 164–166° C.

EXAMPLE 5

N⁶-methyl-exo-2',3'-O-(p-chlorobenzylidene)-adenosine

In a manner analogous to that described in Example 4A, there was obtained from 1-methyl-exo-2',3'-O-(p-chlorobenzylidene)-adenosine-iodide, in a yield of 4 g. (77% of theory), the compound N⁶-methyl-exo-2',3'-O-(p-chlorobenzylidene)-adenosine, which had a melting point of 155–157° C.

The 1-methyl-exo-2',3'-O-(p-chlorobenzylidene)-adenosine-iodide used as starting material was prepared by a procedure analogous to that described in Example 4A, by reaction of 5 g. exo-2',3'-O-(p-chlorobenzylidene)-adenosine with 5 ml. methyl iodide in 50 ml. dimethyl formamide. The exo-2',3'-O-(p-chlorobenzylidene)-adenosine was prepared in the following manner: To a slurry of 60 g. adenosine in 600 ml. dimethyl formamide, there were successively added, at −5 to 0° C., 120 g. p-chlorobenzaldehyde dimethyl acetal and 96 ml. 6 N hydrochloric acid in dioxan. The solution was stirred at 0° C. until it was clear. The reaction mixture was then left to stand for 3 days in a refrigerator and for 1 day at ambient temperature. Thereafter, the reaction mixture was poured, with stirring, into a solution of 75 g. ammonium carbonate in 3 litres water. Any precipitated material which formed was filtered off with suction and washed with ether. There were obtained 47 g. (54% of theory) 2',3'-O-(4-chlorobenzylidene)-adenosine, which melted above 250° C., with decomposition.

EXAMPLE 6

N⁶-isobutyl-exo-2',3'-O-benzylidene-adenosine

A mixture of 2 g. 6-chloro-9-(exo-2',3'-O-benzylidene-β-D-ribosyl)-purine, 33 ml. isopropanol and 0.78 g. isobutylamine was boiled under reflux for 2 hours. The reaction mixture was then evaporated in a vacuum, the residue taken up in chloroform and the chloroform phase washed with an aqueous solution of sodium bicarbonate and with water. The washed chloroform solution was then evaporated and the residue triturated with ether. There were thusly obtained 1.4 g. (64% of theory) N⁶-isobutyl-exo-2',3'-O-benzylidene-adenosine, which had a melting point of 117–118° C.

The 6-chloro-9-(exo-2',3'-O-benzylidene-β-D-ribosyl)-purine used as starting material was prepared in the following manner: 8 g. 6-chloropurine-9-β-D-riboside were introduced into 80 ml. dimethyl formamide and, while stirring at a temperature of 0° C., successively mixed with 8 g. benzaldehyde dimethyl acetal and 8 ml. 5 N hydrochloric acid in dioxan. The reaction mixture was left to stand for 4 days at 0° C. and then poured into a solution of ammonium bicarbonate. Some ligroin was added and the solid material filtered off with suction. There were thereby obtained 6 g. (58% of theory) 6-chloro-9-(exo-2',3'-O-benzylidene-β-D-ribosyl)-purine, which had a melting point of 170–172° C.

EXAMPLE 7

N⁶-benzyl-exo-2',3'-O-benzylidene-adenosine

From 1 g. 6-chloro-9-(exo-2',3'-O-benzylidene-β-D-ribosyl)-purine and 1 g. benzylamine in boiling n-butanol, there was obtained following a procedure analogous to that described in Example 6, 0.9 g. (75% of theory) N⁶-benzyl-exo-2',3'-O-benzylidene-adenosine, which had a melting point of 89–91° C.

EXAMPLE 8

N⁶-β-phenethyl-exo-2',3'-O-benzylidene-adenosine

In a manner analogous to that described in Example 6, from 1 g. 6-chloro-9-(exo-2',3'-O-benzylidene-β-D-ribosyl)-purine, and 1.2 g. β-phenethylamine in 10 ml. n-butanol, there was obtained 0.8 g. (65% of theory) N⁶-β-phenylethyl-exo-2',3'-O-benzylidene-adenosine, which had a melting point of 87–89° C.

EXAMPLE 9

N⁶-cyclopropyl-exo-2',3'-O-benzylidene-adenosine

Using a method analogous to that described in Example 6, 5 g. 6-chloro-9-(exo-2',3'-O-benzylidene-β-D-ribosyl)-purine and 5 g. cyclopropylamine in 100 ml. isopropanol were reacted for 4 hours at 70° C. in a glass autoclave. There were thusly obtained 4.5 g. (85% of theory) N⁶-cyclopropyl-exo-2',3'-O-benzylidene-adenosine, which had a melting point of 120–122° C.

EXAMPLE 10

N⁶-isobutyl-2',3'-O-cyclohexylidene-adenosine 30 ml. 4 N hydrochloric acid in dioxan were added, with cooling, to a mixture of 15 g. N⁶-isobutyl-adenosine, 150 ml. dimethyl formamide and 25 g. cyclohexanone-dimethyl acetal. The reaction mixture was allowed to stand overnight, then poured into an aqueous solution of ammonium bicarbonate and extracted with ether. The dried ethereal solution was evaporated and the residue, after trituration with some ether, filtered with suction. There were thereby obtained 10.5 g. (56% of theory) N⁶-isobutyl-2',3'-O-cyclohexylidene-adenosine, which had a melting point of 125–127° C.

The N⁶-isobutyl-adenosine used as starting material was prepared, in a manner analogous to that described by Lettré and Ballweg (loc. cit.), from 6-chloropurine-9-β-D-riboside and n-butylamine and had a melting point of 154–155° C.

EXAMPLE 11

N⁶-methyl-exo-2'-3'-O-(3,4-dichlorobenzylidene)-adenosine 1.8 g. crude 1-methyl-exo-2',3'-O-(3,4-dichlorobenzylidene)-adenosine-iodide were heated on a water bath for 30 minutes with 20 ml. 2 N sodium hydroxide solution and 20 ml. water. After cooling, the reaction mixture was extracted with chloroform. The residue remaining after evaporation of the chloroform extract was recrystallized from methanol. There was obtained 0.7 g. N⁶-methyl-exo-2',3'-O-(3,4-dichlorobenzylidene)-adenosine, which had a melting point of 177–178° C.

The 1-methyl-exo-2',3'-O-(3,4-dichlorobenzylidene)-adenosine used as starting material, was prepared in the following manner: 1.3 g. exo-2',3'-O-(3,4-dichlorobenzylidene)-adenosine were stirred for 12 hours with 20 ml. N-dimethyl-acetamide and 1.3 ml. methyl iodide. The reaction mixture was then poured into 300 ml. ether and filtered with suction. There were obtained 1.8 g. crude 1-methyl-exo-2',3'-O-(3,4-dichlorobenzylidene)-adenosine-iodide. The exo-2',3'-O-(3,4-dichlorobenzylidene)-adenosine was prepared in the following manner: 25 ml. 4.5 N hydrochloric acid in dioxan was added at 0° C. to a mixture of 13.4 g. adenosine, 140 ml. dimethyl formamide and 30 g. 3,4-dichlorobenzaldehyde dimethyl acetal.

The reaction mixture was allowed to stand for 3 days at 0° C. and then poured, with stirring, into a solution of ammonium carbonate. After extraction with a little chloroform, the solid material which formed was filtered off with suction. There were obtained 4.25 g. (20% of theory) 2',3' - O - (3,4 - dichlorobenzylidene) - adenosine, which had a melting point of 254–255° C.

EXAMPLE 12

N6-allyl-exo-2',3'-O-benzylidene-adenosine 5 g. exo-2',3'-O-benzylidene-adenosine were slurried in 40 ml. N-dimethyl-acetamide and 15 ml. allyl iodide. The reaction mixture was stirred for 3 hours, 600 ml. ether added thereto and the precipitated oil separated by decantation. This oil is crude 1-allyl-exo-2',3'-O-benzylidene-adenosine-iodide. The oil was dissolved in 10 ml. methanol and then mixed with 100 ml. 1 N sodium-hydroxide solution. The resulting reaction mixture was boiled for 15 minutes. It was then cooled and extracted with ether. By slow evaporation, there were separated out crystals of N6-allyl-exo-2',3'-O-benzylidene-adenosine, which had a melting point of 103–105° C. The yield amounted to 3 g. (54% of theory).

EXAMPLE 13

N6-allyl-exo-2',3'-O-(p-chlorobenzylidene)-adenosine

In a manner analogous to that described in Example 12, from exo-2',3'-O-(p-chlorobenzylidene)-adenosine and allyl iodide, there was obtained an oil which, following heating in 10 ml. methanol and 100 ml. 1 N sodium hydroxide solution, was converted into N6-allyl-exo-2',3'-O-(p-chlorobenzylidene)-adenosine, which had a melting point of 123–124° C.

EXAMPLE 14

N6-propyl-exo-2',3'-O-(p-chlorobenzylidene)-adenosine 2.2 g. N6-allyl-exo-2',3'-O-(p-chlorobenzylidene)-adenosine (prepared by the method described in Example 13) were dissolved in 50 ml. methanol and then hydrogenated in the presence of Raney nickel but without the use of pressure. The reaction mixture was then filtered and evaporated and the residue recrystallized from benzene. There were obtained 1.9 g. (83% of theory) N6-propyl-exo-2',3'-O-(p-chlorobenzylidene)-adenosine, which had a melting point of 110–112° C.

EXAMPLE 15

N6-(n-propyl)-exo-2',3'-O-benzylidene-adenosine 1.5 g. N6-allyl-2',3'-O-benzylidene-adenosine (prepared by the method described in Example 12) were catalytically hydrogenated analogously to the procedure described in Example 14. There were thusly obtained 0.8 g. (53% of theory) N6-(n-propyl)-exo-2',3'-O-benzylidene-adenosine, which had a melting point of 140–141° C.

EXAMPLE 16

N6-isopropyl-exo-2',3'-O-(p-chlorobenzylidene)-adenosine

In a manner analogous to that described in Example 6, starting from 1.5 g. 6-chloro-9-[exo-2',3'-O-(p-chlorobenzylidene)-β-D-ribosyl]-purine and 1 g. isopropylamine, there was obtained 0.7 g. (43% of theory) N6-isopropyl-exo-2',3'-O-(p-chlorobenzylidene)-adenosine, which had a melting point of 129–130° C.

The 6-chloro-9-[exo-2',3'-O-(p-chlorobenzylidene)-β-D-ribosyl]-purine used as starting material was prepared in the following manner: 30 g. 6-chloropurine-9-β-D-riboside were slurried in 300 ml. dimethyl formamide and then successively mixed at 0° C. with 59.6 g. 4-chlorobenzaldehyde-dimethyl acetal and 31.5 ml. 4 N hydrochloric acid in dioxan. The resulting reaction mixture was left to stand for 3 days at 0° C. and for one day at ambient temperature. The reaction mixture was then poured into a solution of ammonium bicarbonate. Some ligroin was added thereto and the solid material which formed filtered off with suction. There were thusly obtained 21 g. (48.5% of theory) 6-chloro-9-[exo-2',3'-O-(p-chlorobenzylidene)-β-D-ribosyl]-purine, which had a melting point of 192° C.

EXAMPLE 17

N6-isobutyl-exo-2',3'-O-(p-chlorobenzylidene)-adenosine

In a manner analogous to that described in Example 16, starting from 1.5 g. 6-chloro-9-[exo-2',3'-O-(p-chlorobenzylidene)-β-D-ribosyl]-purine and 1.5 g. isobutylamine, there was obtained 1 g. (55% of theory) N6-isobutyl-exo-2',3'-O-(p-chlorobenzylidene)-adenosine, which had a melting point of 93–94° C.

EXAMPLE 18

N6-benzyl-exo-2',3'-O-(p-chlorobenzylidene)-adenosine

In a manner analogous to that described in Example 16, starting from 1.5 g. 6-chloro-9-[exo-2',3'-O-(p-chlorobenzylidene)-β-D-ribosyl]-purine and 1.2 g. benzylamine, there was obtained 1.8 g. (51% of theory) N6-benzyl-exo-2',3'-O-(p-chlorobenzylidene)-adenosine, which had a melting point of 86–87° C.

EXAMPLE 19

N6-cyclopropyl-exo-2,3'-O-(p-chlorobenzylidene)-adenosine

In a manner analogous to that described in Example 16, starting from 1.5 g. 6-chloro-9-[exo-2',3'-O-(p-chlorobenzylidene)-β-D-ribosyl]-purine and 3 g. cyclopropylamine, there was obtained 0.9 g. (53% of theory) N6-cyclopropyl - exo - 2',3'-O-(p-chlorobenzylidene)-adenosine, which had a melting point of 67–68° C.

EXAMPLE 20

N6-methyl-exo-2',3'-O-(m-chlorobenzylidene)-adenosine 3.5 g. 1 - methyl - exo-2',3'-O-(m-chlorobenzylidene)-adenosine-iodide were treated with 0.5 N sodium hydroxide solution in a manner analogous to that described in Example 4A. There were obtained 1.6 g. (52% of theory) N6 - methyl-exo-2',3'-O-(m-chlorobenzylidene)-adenosine, which had a melting point of 172–173° C.

The starting material used was obtained from 3 g. exo-2',3' - O - (m-chlorobenzylidene)-adenosine and methyl iodide by a procedure analogous to that described in Example 4A. The exo - 2',3'-O-(m-chlorobenzylidene)-adenosine was obtained from adenosine and 3-chlorobenzaldehyde dimethyl acetal using a method analogous to that described in Example 5.

EXAMPLE 21

N6-propargyl-exo-2',3'-O-benzylidene-adenosine

In a manner analogous to that described in Example 6, starting from 1.5 g. 6-chloro-9-(exo-2',3'-O-benzylidene-β-D-ribosyl)-purine and 0.44 g. propargylamine in 20 ml. n-butanol, there was obtained, after boiling under reflux for 2 hours and working up in the usual manner, 0.6 g. (38% of theory) N6-propargyl-exo-2',3'-O-benzylidene-adenosine, which had a melting point of 140–141° C.

EXAMPLE 22

N6-propargyl-exo-2',3'-O-(p-chlorobenzylidene)-adenosine

In a manner analogous to that described in Example 21, starting from 1.5 g. 6-chloro-9-[exo-2',3'-O-(p-chlorobenzylidene)-β-D-ribosyl]-purine and 0.44 g. propargylamine, there was obtained 1 g. (61% of theory) N6-propargyl - exo - 2',3' - O - (p-chlorobenzylidene)-adenosine, which had a melting point of 142–143° C.

EXAMPLE 23

N6-(L-2-phenyl-isopropyl)-exo-2',3'-O-benzylidene-adenosine 1.5 g. 6-chloro-9-(exo-2',3'-O-benzylidene-β-D-ribosyl)- purine and 1.1 g. L-phenyl-isopropylamine were boiled for 2 hours in 20 ml. n-butanol. The reaction mixture was then evaporated and the residue extracted with ether and water. The dried ether extract was evaporated and the residue brought to crystallization by trituration with ether/ligroin. There were obtained 1.3 g. (68% of theory) $N^6$- (L-2-phenyl-isopropyl)-exo-2',3'-O-benzylidene-adenosine, which had a melting point of 83-84° C.

EXAMPLE 24

$N^6$-(L-2-phenyl-isopropyl)-exo-2',3'-O-(p-chlorobenzylidene)-adenosine

In a manner analogous to that described in Example 23, starting from 1.5 g. 6-chloro-9-[exo-2',3'-O-(p-chlorobenzylidene)-β-D-ribosyl]-purine and 1 g. L-phenyl-isopropylamine, there were obtained 1.5 g. (80% of theory) $N^6$- (L-2-phenyl-isopropyl)-exo-2',3'-O-(p-chlorobenzylidene)-adenosine, which had a melting point of 112–113° C.

EXAMPLE 25

$N^6$-(sec.-butyl)-exo-2',3'-O-benzylidene-adenosine 3.7 g. 6-chloro-9-(exo-2',3'-O-benzylidene-β-D-ribosyl)-purine and 1.6 g. sec.-butylamine were boiled for 2 hours in 50 ml. isopropanol, and thereafter further worked up using a procedure analogous to that described in Example 23. The residue obtained after evaporation of the ether extract was brought to crystallization by trituration with ligroin. There were thusly obtained 2.8 g. (68% of theory) $N^6$- (sec.-butyl)-exo-2',3'-O-benzylidene-adenosine, which had a melting point of 105–108° C.

The compounds in accordance with the invention belong to the class of compounds known as nucleoside ketals. This class of compounds is characterized in that they effect simultaneously with an increase in the heart minute volume an increase in the blood circulation to the kidneys. As a result, on administration of a nucleoside ketal, a distinct increase in the excretion of sodium takes place. Therefore the increased excretion of sodium can be used to evaluate the circulation stimulating activity of new compounds falling within this class or structurally closely related to the compounds of this class.

The test procedures involved in determining whether or not there has been an increase in sodium excretion as compared to the procedures involved in directly measuring changes in circulation dynamics are much simpler and easier to carry out. Further the determinations regarding sodium excretion can be carried out using unanesthetized animals and over considerably prolonged periods. In this connection only those compounds are considered effective whose activity is manifested over a prolonged perod.

The tests were carried out using female Sprague-Dawley rats. The control sodium values were established, the test compounds were then administered orally (10 ml./kg. of an aqueous suspension containing additionally 0.5% tylose). The animals' urine was then collected for 6 hours and the sodium content again determined.

The following compounds were employed in the test procedures:

A—2',3'-isopropylidene-adenosine (comparison)
B—$N^6$-methyl-2',3'-O-benzylidene-adenosine
C—$N^6$-methyl-exo-2',3'-O-(p-chlorobenzylidene)-adenosine
D—$N^6$-β-phenethyl-exo-2',3'-O-benzylidene-adenosine
E—$N^6$-cyclopropyl-exo-2',3'-O-benzylidene-adenosine
F—$N^6$-isobutyl-2',3'-O-cyclohexylidene-adenosine
G—$N^6$-methyl-exo-2',3'-O-(3,4-dichlorobenzylidene)-adenosine
H—$N^6$-allyl-exo-2',3'-O-benzylidene-adenosine
I—$N^6$-allyl-exo-2',3'-O-(p-chlorobenzylidene)-adenosine
J—$N^6$-(n-propyl)-exo-2',3'-O-benzylidene-adenosine
K—$N^6$-isobutyl-exo-2',3'-O-(p-chlorobenzylidene)-adenosine
L—$N^6$-cyclopropyl-exo-2',3'-(p-chlorobenzylidene)-adenosine
M—$N^6$-methyl-exo-2',3'-O-(m-chlorobenzylidene)-adenosine
N—$N^6$-propargyl-exo-2',3'-O-(p-chlorobenzylidene)-adenosine The results of the test procedures are set out in the following table:

TABLE.—SODIUM EXCRETION IN URINE FOLLOWING ORAL ADMINISTRATION OF ADENOSINE DERIVATIVES

| Compound | Mg./kg. | Example | Mval. Na/kg. in 6 hr. | Number of animals (rats) |
|---|---|---|---|---|
| Control | | | 0.42 | 90 |
| A | 50 | (1) | 0.36 | 15 |
| B | 25 | 4 | 1.1 | 15 |
| C | 25 | 5 | 4.1 | 75 |
| D | 25 | 8 | 0.50 | 15 |
| E | 25 | 9 | 0.57 | 15 |
| F | 25 | 10 | 0.54 | 15 |
| G | 25 | 11 | 1.9 | 15 |
| H | 25 | 12 | 1.1 | 15 |
| I | 25 | 13 | 1.1 | 15 |
| J | 25 | 15 | 0.76 | 15 |
| K | 25 | 17 | 0.51 | 15 |
| L | 25 | 19 | 3.7 | 15 |
| M | 25 | 20 | 2.2 | 15 |
| N | 25 | 22 | 0.67 | 15 |

[1] 2',3'-isopropylidene-adenosine (comparison).

As can be seen from the table, the comparison compound, isopropylidene-adenosine was entirely without effect as concerns increased excretion of sodium. In contrast, the compounds of the invention act to cause an increase in the excretion of sodium of up to 10 times that observed in the control (untreated) animal.

As previously indicated, the adenosine derivatives of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and mutiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 50–500 mg. active ingredient per dosage unit. Preferably, the compositions are compounded so that for parenteral administration, 50–200 mg. of active compound/dosage unit is present and for oral administration 200–500 mg. of compound/dosage unit.

We claim:
1. An $N^6$-substituted adenosine derivative having the formula:

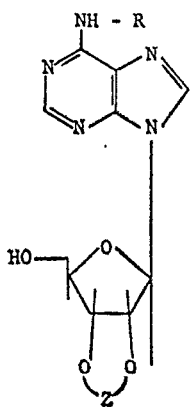

wherein R is a member selected from the group consisting of lower alkyl, lower alkenyl, lower alkynyl, cyclopropyl and phenyl substituted lower alkyl, and Z is a member selected from the group consisting of unsubstituted and substituted cyclohexylidene and benzylidene wherein said substituent is a member selected from the group consisting of chloro, alkoxy, alkylthio, methylenedioxy, alkyl and trifluoromethyl.

2. An $N^6$-substituted adenosine derivative according to claim 1 designated $N^6$-methyl-2',3'-O-benzylidene-adenosine.

3. An $N^6$-substituted adenosine derivative according to claim 2 designated $N^6$-methyl-exo-2',3'-O-(p-chlorobenzylidene)-adenosine.

4. An $N^6$-substituted adenosine derivative according to claim 2 designated $N^6$-methyl-exo-2',3'-O-(3,4-dichlorobenzylidene)-adenosine.

5. An $N^6$-substituted adenosine derivative according to claim 2 designated $N^6$-allyl-exo-2'-3'-O-benzylidene-adenosine.

6. An $N^6$-substituted adenosine derivative according to claim 2 designated $N^6$-allyl-exo-2',3'-O-chlorobenzylidene)-adenosine.

7. An $N^6$-substituted adenosine derivative according to claim 2 designated $N^6$-cyclopropyl-exo-2',3'-O-(p-chlorobenzylldene)-adenosine.

8. An $N^6$-substituted adenosine derivative according to claim 2 designated $N^6$-methyl-exo-2',3'-O-(m-chlorobenzylidene)-adenosine.

References Cited
UNITED STATES PATENTS

| | | | |
|---|---|---|---|
| 3,014,900 | 12/1961 | Schroeder | 260—211.5 |
| 3,201,389 | 8/1965 | Fujimoto et al. | 260—211.5 |
| 3,225,029 | 12/1965 | Yamaoka | 260—211.5 |

LEWIS GOTTS, Primary Examiner

JOHNNIE R. BROWN, Assistant Examiner

U.S. Cl. X.R.
424—180

UNITED STATES PATENT OFFICE
CERTIFICATE OF CORRECTION

Patent No. 3,471,472                      October 7, 1969

Max Thiel et al.

It is certified that error appears in the above identified patent and that said Letters Patent are hereby corrected as shown below:

Column 1, line 20, "N-substituted" should read -- $N^6$-substituted --. Column 2, line 46, "aketal" should read -- a ketal --. Column 6, line 17, "phenylethyl" should read -- phenethyl --. Column 9, line 52, "perod" should read -- period --. Column 12, line 11, "O-chlorobenzylidene)-" should read -- -O-p-chlorobenzylidene)- --; line 15, "zylldene)-" should read -- zylidene- --.

Signed and sealed this 2nd day of June 1970.

(SEAL)
Attest:

Edward M. Fletcher, Jr.                      WILLIAM E. SCHUYLER, JR.
Attesting Officer                              Commissioner of Patents